US006440381B1

(12) United States Patent
Smith et al.

(10) Patent No.: US 6,440,381 B1
(45) Date of Patent: Aug. 27, 2002

(54) CONTINUOUS PRODUCTION OF SILICA VIA ION EXCHANGE

(75) Inventors: Douglas M. Smith; Kevin H. Roderick, both of Albuquerque, NM (US); Alok Maskara, Evanston, IL (US); Kenneth C. Koehlert, Champaign, IL (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/231,366

(22) Filed: Jan. 13, 1999

Related U.S. Application Data

(60) Provisional application No. 60/071,547, filed on Jan. 15, 1998.

(51) Int. Cl.[7] ............................................. C01B 33/193
(52) U.S. Cl. ...................................... 423/335; 423/325
(58) Field of Search ................................ 423/335, 338, 423/339, 325

(56) References Cited

U.S. PATENT DOCUMENTS

| 2,244,325 A | * | 6/1941 | Bird ........................... 423/593 |
| 3,652,214 A | | 3/1972 | Aboutboul et al. |
| 4,230,679 A | * | 10/1980 | Mahler et al. .............. 423/335 |
| 4,418,042 A | * | 11/1983 | Yan |
| 4,465,657 A | * | 8/1984 | Spijker ........................ 423/339 |
| 4,661,258 A | * | 4/1987 | Phillips ....................... 210/661 |
| 4,751,060 A | | 6/1988 | Kratochwill |
| 4,970,344 A | * | 11/1990 | Keller |
| 5,006,258 A | * | 4/1991 | Veatch et al. |
| 5,126,056 A | * | 6/1992 | Carlson ....................... 210/676 |
| 5,130,110 A | * | 7/1992 | Rouet et al. ................. 423/338 |

OTHER PUBLICATIONS

Perry, Robert .ed., Perry's Chemical Engineer's Handbook 6th ed, p. 16–10 and 19–44 (McGraw–Hill Book, Co, New York, 1984).*

* cited by examiner

*Primary Examiner*—Stuart L. Hendrickson

(57) ABSTRACT

A continuous process for the conversion of sodium silicate to silicic acid, wherein a moving bed of a protonated ion exchange resin is contacted with an inlet stream of sodium silicate to provide an outlet stream of silicic acid. The outlet stream of silicic acid produced thereby can be processed into a variety of silica products. The outlet moving bed of spent sodium-enriched ion-exchange resin is continuously regenerated into protonated ion-exchange resin by contacting the spent resin with an inlet stream of acid of sufficient strength to exchange the sodium ions in the spent resin with a proton. The regenerated protonated ion-exchange resin is continuously recycled back into the sodium silicate stream for further production of silicic acid.

15 Claims, 2 Drawing Sheets

US 6,440,381 B1

CONTINUOUS PRODUCTION OF SILICA VIA ION EXCHANGE

This patent application claims priority to provisional U.S. patent application Serial No. 60/071,547 filed on Jan. 15, 1998.

TECHNICAL FIELD OF THE INVENTION

The present invention relates to the production of silicic acid from sodium silicates.

BACKGROUND OF THE INVENTION

Silica, an inorganic material having silicon dioxide ($SiO_2$) as a basic structural unit, is useful in a wide variety of commercial applications. Silica exists in a variety of molecular forms, which include, for example, monomers, dimers, oligomers, cyclic forms, and polymers. In addition, silica can be amorphous, crystalline, hydrated, solvated, or dry, and can exist in a variety of particulate and aggregation states.

Silica solutions exhibit polymerization behavior, resulting in the increase of Si—O—Si bonds and decrease of Si—OH bonds. In an aqueous medium, amorphous silica dissolves (and/or depolymerizes), forming $Si(OH)_4$, which undergoes polymerization to form discrete particles with internal Si—O—Si bonds and external Si—OH bonds on the particle surface. Under certain conditions, the polymeric silica particles thus formed will further associate to give chains and networks comprising the individual particles.

Generally, under neutral or alkaline conditions (pH 7 or greater), the particles tend to grow in size and decrease in number, whereas under acidic conditions (pH<7), the particles have a greater tendency to agglomerate to form chains, and eventually three dimensional networks. If salts are present which neutralize the charge produced on the particle surface, agglomeration of particles will be more likely to occur under neutral or alkaline conditions.

The term "sol" refers to a stable dispersion of discrete, colloid-size particles of amorphous silica in aqueous solutions. Under the proper conditions, sols do not gel or settle even after several years of storage, and may contain up to about 50% silica and particle sizes up to 300 nm, although particles larger than about 70 nm settle slowly. A sol can be formed, for example, by growing particles to a certain size in a weakly alkaline solution, or by addition of dilute acid to a solution of sodium silicate (e.g., $Na_2SiO_3$) with rapid mixing, until the pH drops to about 8–10, followed by removal of $Na^+$ (e.g., by ion-exchange resin or electrodialysis). Silica sols, depending upon the type of silica, the particle size, and the nature of the particles, can form gels under mildly acidic to strongly acidic conditions.

The term "gel" refers to a coherent, rigid, continuous three-dimensional network of particles of colloidal silica. Gels can be produced by the aggregation of colloidal silica particles (typically under acidic conditions when neutralizing salts are absent) to form a three-dimensional gel microstructure. Whether a gel will form under a particular set of conditions, however, can depend on the silica properties, such as, for example, particle size and the nature of the particle surface. The term "hydrogel" refers to a gel in which the pores (spaces within the gel microstructure) are filled with water. Similarly, the term "alcogel" refers to a gel in which the pores are filled with an alcohol. When a gel is dried (liquid removed from the pores) by means in which the coherent gel microstructure collapses (e.g., by solvent evaporation), a relatively high density collapsed powder, or "xerogel", is formed. In contrast, when a gel is dried by means in which the gel microstructure is preserved (e.g., supercritical drying as described in U.S. Pat. No. 3,652,214), a low density "aerogel" is formed. Silica aerogels have very unusual and highly desirable properties such as, for example, optical transparency, extremely low density, and unprecedented low thermal conductivity. See Herrmann et al., *Journal of Non-Crystalline Solids*, 186, 380–387 (1995). Silica aerogels are useful in a wide variety of applications which include, for example, thermal insulators and reinforcing fillers for elastomers. Although raw material costs are very low, economically feasible processes for producing aerogels have been pursued unsuccessfully for decades.

The commercial success of all silica products depends on the cost and the availability of silica. The most common raw materials used in the production of silica products include sodium silicate (($Na_2O) \times (SiO_2)_y$), chlorosilanes ($R_xSiCl_{4-x}$), and silicon alkoxides ($Si(OR)_4$). Among these common raw materials, sodium silicate has the lowest cost on a per-pound basis and is a commodity chemical which is available in very large quantities. Sodium silicate can be readily reacted to produce silicic acid ($Si(OH)_4$), from which a wide range of silica microstructures, ranging from high surface area gels to colloidal particles, can be produced. The silicic acid can be subsequently processed (e.g., gelled, precipitated, etc.) by changing the temperature, pH, and/or solids content.

One of the most significant problems associated with utilizing sodium silicate in silica production is the contamination of silica with residual sodium, which is undesirable in many applications. There are several common methods for separating residual sodium from sodium silicate-derived silica. For example, the sodium silicate can be diluted to the desired solids content and reacted with acid to make silica and an aqueous salt solution. In this situation, salt is typically removed by either washing or by adding an organic solvent to precipitate salt crystals, which are removed by decanting or centrifugation. However, washing is disadvantageous in that it yields a very dilute salt stream and further results in high residual sodium concentrations (typically greater than 100 ppm). Precipitation of salt crystals by an organic solvent also has the disadvantage of relatively high residual sodium concentrations. A third approach is to feed sodium silicate into an acid ion-exchange bed which exchanges the sodium ions with protons, providing an outlet stream of silicic acid. The ion-exchange bed approach is advantageous in that it yields the lowest residual sodium concentration. Further, the ion-exchange resin can be regenerated with acid and reused. Nonetheless, there are significant disadvantages in the production of silica using current ion-exchange methods. Typically, several fixed ion exchange beds are used, and the sodium removal and resin regeneration steps are cycled sequentially between beds. This requires high capital costs for equipment such as, for example, bed vessels, piping, and controls. Resin fouling due to gellation of silica also is a major problem, particularly in gel production. Silica rapidly gels when the pH is lowered to about 6. Gellation typically occurs in the ion-exchange resin at the reaction front, where the strong acid-base neutralization occurs. However, gellation also can occur during a process upset. Any resin fouling results in significant costs in cleanup and ion-exchange resin replacement. Production of changeover waste is also a problem. When a fixed bed ion-exchange column is shut down to be regenerated, it still contains silica and silicic acid, which contaminates the waste salt stream liberated as the column is regenerated, lowering the yield of silica and complicating salt recovery and/or disposal. Further, when a freshly regenerated column is used for sodium removal, the initial gradient of silicic acid generated on startup creates variations in the product composition, causing problems with product quality.

In view of the foregoing problems, there exists a need for an improved process for the conversion of silica from sodium silicate. The present invention provides such a process. These and other advantages of the present invention, as well as additional inventive features, will be apparent from the description of the invention provided herein.

BRIEF SUMMARY OF THE INVENTION

The present invention provides a continuous process for the conversion of sodium silicate to silicic acid, wherein a moving bed of a protonated ion exchange resin, which exchanges a sodium ion in sodium silicate with a proton, is contacted with an inlet stream of sodium silicate to provide an outlet stream of silicic acid. The outlet stream of silicic acid produced thereby can be processed into a variety of silica products. When the proton exchange occurs, forming silicic acid, the outlet moving bed of spent resin becomes enriched in sodium ions. The spent sodium-enriched ion-exchange resin is continuously regenerated into protonated ion-exchange resin by contacting the spent resin with an inlet stream of acid of sufficient strength to exchange the sodium ions in the spent resin with a proton. The moving bed of regenerated protonated ion-exchange resin is continuously recycled back into the sodium silicate stream for further production of silicic acid. The sodium-enriched outlet stream produced from regeneration of the ion-exchange resin can be processed as waste or for sodium recovery.

DESCRIPTION OF THE PREFERRED EMBODIMENTS

The present invention provides a continuous process for the conversion of sodium silicate to silicic acid, wherein a moving bed of a protonated ion exchange resin, which exchanges a sodium ion in sodium silicate with a proton, is contacted with an inlet stream of sodium silicate to provide an outlet stream of silicic acid. The outlet stream of silicic acid produced thereby can be processed into a variety of silica products. When the proton exchange occurs, forming silicic acid, the outlet moving bed of spent resin becomes enriched in sodium ions. The spent sodium-enriched ion-exchange resin is continuously regenerated into protonated ion-exchange resin by contacting the spent resin with an inlet stream of acid of sufficient strength to exchange the sodium ions in the spent resin with a proton. The exiting regenerated protonated ion-exchange resin is continuously recycled back into the sodium silicate stream for further production of silicic acid. The sodium ion-enriched outlet stream produced by regeneration of the ion-exchange resin is processed as waste or for sodium recovery.

Figure 1:
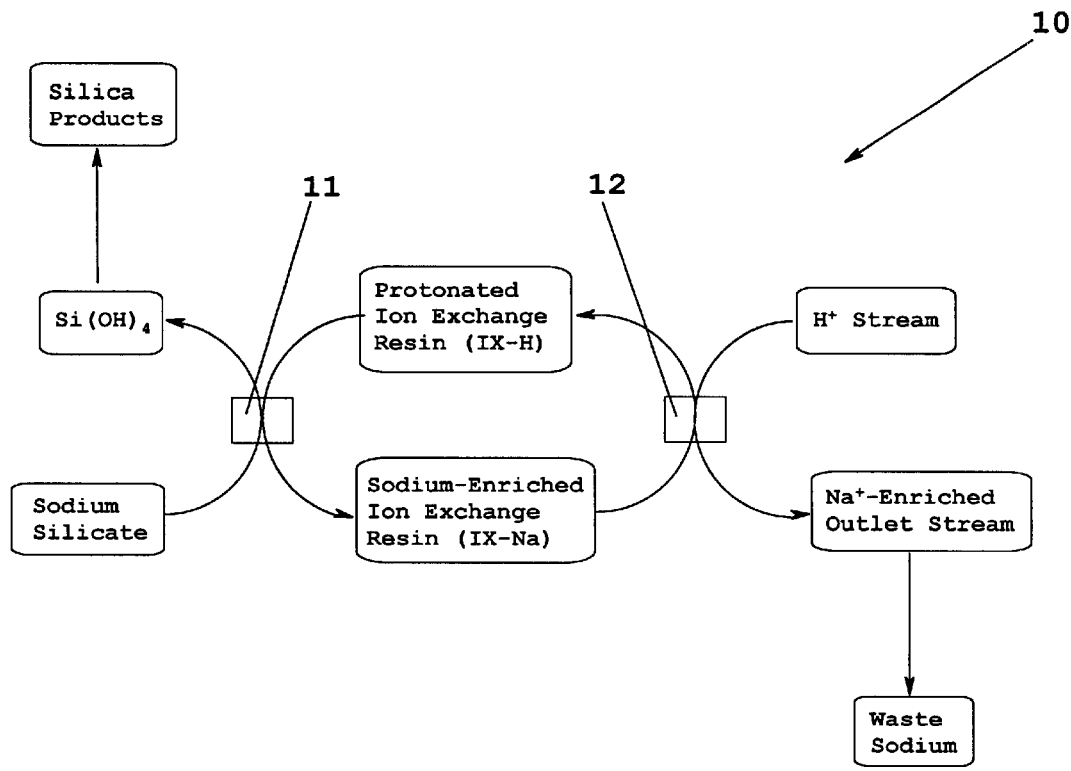
FIG. 1 schematically depicts the continuous production of silica from sodium silicate according to the present invention.

The continuous process of the present invention 10 is schematically depicted in FIG. 1. The protonated ion-exchange resin (IX-H) comes into contact with the sodium silicate stream at juncture 11 to provide an outlet stream of silicic acid ($Si(OH)_4$) and an outlet moving bed of spent ion-exchange resin enriched in sodium ions (IX-Na). The outlet stream of silicic acid can be further processed into a variety of silica products such as, for example, sols, gels, and surface-modified silicas. The outlet bed of IX-Na is continuously recycled by contacting with an inlet stream of acid at juncture 12 to provide freshly regenerated protonated ion-exchange resin and an outlet stream of spent acid enriched in sodium ions. The regenerated protonated ion-exchange resin is continuously fed back into the sodium silicate stream at juncture 11.

There are numerous advantages in the continuous process of the present invention. First, since the operation is truly continuous, it essentially eliminates variation in the silicic acid concentration, minimizes changeover waste, and makes the operation less complex. Secondly, the process has the ability to produce concentrated salt streams from resin regeneration, lowering water consumption and salt recovery costs (if applicable). Thirdly, since the process utilizes a moving ion-exchange bed, the ion-exchange resin is used more efficiently with less chance of resin fouling, significantly lowering capital costs.

The direct proton source for the conversion of sodium silicate into silicic acid is the protonated ion-exchange resin. Any suitable protonated ion-exchange resin can be used in the present invention. Suitable protonated ion-exchange resins include those resins which possess sufficient acid strength to exchange a proton with a sodium ion in the sodium silicate and which are capable of being continuously regenerated in a suitable acid stream. A person of ordinary skill in the art will appreciate that the preferred protonated ion-exchange resin to be used for a particular embodiment of the present invention depends on several factors such as, for example, the concentration of sodium silicate, the pH of the sodium silicate stream, the cost and availability of the resin, and the ease with which the resin can be regenerated in the inlet acid stream. Suitable protonated ion-exchange resins include sulfonic acid resins such as, for example, sulfonated copolymers of styrene and divinylbenzene, carboxylic acid resins such as, for example, polyacrylic acid resins, and resins wherein protonated ammonium species provide the exchangeable proton such as, for example, protonated polyamine resins. Preferred protonated ion-exchange resins include, for example, resins sold under the trademarks DOWEX (Dow Chemical Company) and Amberlite (Rohm and Haas).

Any suitable form of sodium silicate can be utilized in the process of the present invention. A person of ordinary skill in the art will appreciate that sodium silicate can exist in a variety of different dry salt forms, hydrated salt forms, suspensions, solutions, and combinations thereof. The sodium silicate need not be in any particular form in order to be utilized in the continuous process of the present invention. Of course, the inlet stream of sodium silicate must be in a form which allows the sodium ions to exchange with a proton of the ion-exchange resin. Preferably, the inlet stream of sodium silicate contains at least one sodium silicate species having the empirical formula $(Na_2O)_x(SiO_2)_y \cdot (H_2O)_z$, wherein x, y, and z can be the same or different; x or y is a number from 1 to 5; and z is a number from 0 to 10. Some of the more abundant dry forms of sodium silicate species (i.e., wherein z is 0) include, for example, $Na_2SiO_3$ (x and y are 1), $Na_6Si_2O_7$ (x is 3, and y is 2), and $Na_2Si_3O_7$ (x is 1, and y is 3). The first of the aforesaid sodium silicate species can exist as the pentahydrate $Na_2SiO_3 \cdot 5(H_2O)$ (z is 5, x and y are 1). The inlet stream of sodium silicate can exist in any suitable form which allows the sodium ions to exchange with a proton while in contact with the protonated ion exchange resin. Preferably, the inlet stream of sodium silicate is a liquid stream, which is most preferably an aqueous solution.

Any suitable acid can be used to continuously regenerate protonated ion-exchange resin from the spent sodium-enriched ion-exchange resin (see juncture 12 in FIG. 1). Suitable acids include organic acids such as, for example, p-toluenesulfonic acid, methanesulfonic acid, acetic acid, trifluoroacetic acid, trichloroacetic acid, formic acid, and suitable mixtures thereof. Suitable acids also include inorganic acids such as, for example, sulfuric acid, hydrochloric acid, hydrobromic acid, hydriodic acid, nitric acid, perchloric acid, phosphoric acid, and suitable mixtures thereof. Preferably, the inlet stream of acid utilizes an inorganic acid selected from the group consisting of sulfuric acid and hydrochloric acid.

In the continuous process of the present invention, it is preferred that the inlet stream of sodium silicate is contacted with the protonated ion exchange resin in "counter current" fashion. The term "counter current" as used herein means that the moving bed of ion-exchange resin (regenerated and/or spent) moves in a direction counter-flow to the direction of the moving fluid stream (sodium silicate stream and/or resin-regenerating acid stream) which contacts the resin.

Commercially available mechanical extractors can be used to implement such an approach in the context of the present invention. A suitable such mechanical extractor is commercially available under the trademark "Crown Contactor" (Crown Iron Works Company) and is described in U.S. Pat. No. 4,751,060.

Figure 2:
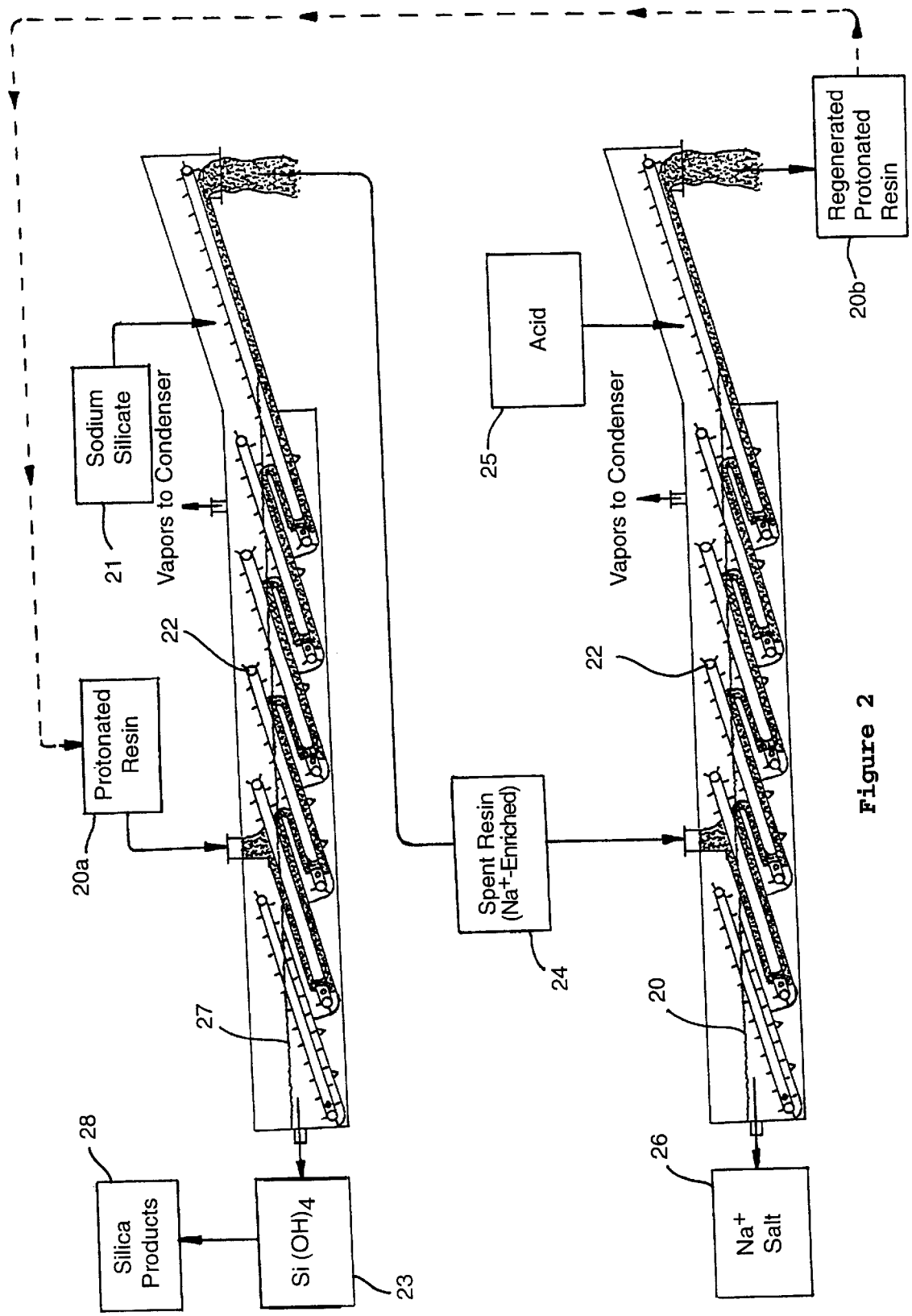
FIG. 2 depicts an apparatus useful in the present inventive process for the continuous production of silica from sodium silicate.

The use of such a mechanical extractor in the context of the present inventive process is illustrated in FIG. 2. As shown in FIG. 2, the inlet stream of sodium silicate 21 is fed into a first mechanical extractor in which a plurality of pools are arranged relative to one another so that the inlet fluid introduced to the uppermost pool cascades successively into subsequently lower pools, and thereafter exits the extractor at or below the liquid level 27. The protonated ion-exchange resin 20a is fed into the extractor through another inlet, and the resin bed is moved via a plurality of conveyors 22, successively, through the cascading pools of sodium silicate in a direction from the lowermost pool to the uppermost pool (i.e., countercurrent to the stream of sodium silicate). The exiting silicic acid stream 23 can be subsequently processed into silica 28, while the exiting sodium-enriched (spent) ion exchange resin 24 can be continuously regenerated by any suitable means. Preferably, the spent ion-exchange resin is regenerated by contacting the spent resin with the resin-regenerating stream of acid in counter current fashion. As also shown in FIG. 2, the spent resin 24 is continuously fed into a second mechanical extractor as described above, except the inlet stream of fluid fed therein is an acid stream 25 which regenerates the resin. The regenerated resin 20b can be continuously recycled back into the first mechanical extractor by any suitable means (represented by dashed arrow) such as, for example, a conveyor belt or a pump. The waste sodium 26 can be disposed of or recovered by any suitable means.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A continuous process for the conversion of sodium silicate to silicic acid comprising:

(a) providing a moving bed comprising a protonated ion exchange resin that exchanges a sodium ion in sodium silicate with a proton, (b) providing an inlet stream of sodium silicate, (c) contacting said inlet stream of sodium silicate with said protonated ion exchange resin in said moving bed to provide an outlet stream of silicic acid and a moving bed comprising a sodium-enriched ion exchange resin, (d) providing an inlet stream of acid that exchanges a sodium ion in said sodium-enriched ion exchange resin with a proton, (e) contacting said inlet stream of acid with said sodium-enriched ion exchange resin in said moving bed to provide a sodium enriched outlet stream and a moving bed comprising a protonated ion exchange resin that exchanges a sodium ion in sodium silicate with a proton, and (f) recycling said protonated ion exchange resin of step (e) in step (a).

2. The continuous process of claim 1, wherein said protonated ion exchange resin is a sulfonic acid ion exchange resin.

3. The continuous process of claim 1, wherein said protonated ion exchange resin is a carboxylic acid ion exchange resin.

4. The continuous process of claim 1, wherein said protonated ion exchange resin comprises a protonated ammonium species.

5. The continuous process of claim 1, wherein said inlet stream of sodium silicate comprises at least one sodium silicate species of empirical formula $(Na_2O) \cdot (SiO_2)_y \cdot (H_2O)_z$, wherein x, y, and z can be the same or different; x or y is a number from 1 to 5; and z is a number from 0 to 10.

6. The continuous process of claim 1, wherein said sodium silicate species is $Na_2SiO_3$.

7. The continuous process of claim 1, wherein said sodium silicate species is $Na_6Si_2O_7$.

8. The continuous process of claim 1, wherein said sodium silicate species is $Na_2Si_3O_7$.

9. The continuous process of claim 1, wherein said sodium silicate species is $Na_2SiO_3 \cdot 5(H_2O)$.

10. The continuous process of claim 1, wherein said inlet stream of sodium silicate is an aqueous solution of sodium silicate.

11. The continuous process of claim 1, wherein said inlet stream of sodium silicate comprises an aqueous suspension of sodium silicate.

12. The continuous process of claim 1, wherein said inlet stream of acid comprises an acid selected from the group consisting of sulfuric acid and hydrochloric acid.

13. The continuous process of claim 1, wherein said inlet stream of sodium silicate is contacted with said protonated ion exchange resin in step (c) in counter current fashion.

14. The continuous process of claim 13, wherein said inlet stream of acid is contacted with said sodium-enriched ion exchange resin in step (e) in counter current fashion.

15. The continuous process of claim 1, wherein said outlet stream of silicic acid is further processed into silica.

* * * * *